(12) United States Patent  (10) Patent No.: US 8,490,783 B1
Fan  (45) Date of Patent: Jul. 23, 2013

(54) PROTECTIVE COVER

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 13/777,392

(22) Filed: Feb. 26, 2013

(51) Int. Cl.
*B65D 51/04* (2006.01)
(52) U.S. Cl.
USPC ........................................ 206/45.23; 206/816
(58) Field of Classification Search
USPC .................. 206/45.2, 45.23, 45.24, 576, 320, 206/701, 722, 724, 816
See application file for complete search history.

(56) References Cited

U.S. PATENT DOCUMENTS

| 5,435,437 | A * | 7/1995 | Sasaki ........................ 206/45.23 |
| 7,694,932 | B1 * | 4/2010 | Ngan ............................ 248/461 |
| 8,297,443 | B2 * | 10/2012 | Ogando ........................ 206/750 |
| 2012/0298535 | A1 * | 11/2012 | Sirichai et al. ............. 206/45.23 |
| 2013/0048514 | A1 * | 2/2013 | Corcoran et al. .......... 206/45.23 |

* cited by examiner

*Primary Examiner* — Jacob K Ackun
(74) *Attorney, Agent, or Firm* — Rabin & Berdo, P.C.

(57) ABSTRACT

A protective cover is provided, including a carrier unit and a protective lid. The carrier unit is for fixing an electronic device. The protective lid is foldable in segments, with one side engaged to the second surface of the carrier unit, and the other side covering the first surface when folded. When folded, the protective lid forms a shape able to shield or support. As such, the electronic device can be clamped by a device holder with taking off the protective cover, and the protective cover provides further capabilities of shielding form sunray and supporting to stand on a flat surface for convenient viewing.

10 Claims, 7 Drawing Sheets

PROTECTIVE COVER

FIELD OF THE INVENTION

The present invention generally relates to a protective cover, and more specifically to a design with capability of protection, shielding and supporting.

BACKGROUND OF THE INVENTION

Smart phone is a popular portable device nowadays and become ubiquitous. With large display screen and a wide range of application programs, the smart phone not only provides communication function, but also serves as personal multimedia player, GPS, electronic books, electronic dictionary, and so on. The additional capabilities come with a price tag. As the new models of the smart phone cost more and more, the user often opts for placing a cover or sleeves over the smart phone for extra protection.

The most popular protective cover at present is of a wrapping structure, including a holding base and an upper lid. The holding base is for fixing the electronic device and the upper lid is flexibly connected to the side of the holding base so as to cover the holding base when flipped to protect over the case and the screen of the electronic device from scratching. However, when the electronic device wrapped with a protective cover is to be used in a car, e.g., as a GPS, the electronic device must be separated from the protective cover to avoid the upper lid from accidentally covering the screen, which causes inconvenience of using the electronic device in different environments.

In addition, the protective cover does not usually provide function of support. To place the electronic device in a tilt position for viewing, an extra support apparatus must be used. In other words, the conventional protective cover provides limited capability and, thus, a multi-functional protective cover is desirable.

SUMMARY OF THE INVENTION

The primary object of the present invention is to provide a multi-functional protective cover, with capability including protection from scratching, sunray-shielding, supporting, and so on, wherein the sunray-shielding being for using inside a car and the supporting is to support the electronic device to stand in a tilt position.

To achieve the above object, the present invention a protective cover, including a carrier unit and a protective lid. The carrier unit includes a first surface and a second surface, disposed oppositely. The first surface is for fixing and holding an electronic device. The protective lid is foldable in segments, with one side engaged to the second surface of the carrier unit, and the other side covering the first surface when folded. The protective lid is engaged to the second surface by an engaging means, and includes a first lid piece, a second connection piece, a third lid piece, a fourth connection piece and a fifth lid piece. The main feature is that the first lid piece is wider than the fifth lid piece, the fifth lid piece has a width wider than or equal to the width of the third lid piece, and the fourth connection piece is flexible. When folded, an edge of the fifth lid piece contacts the second connection piece.

Another embodiment of the present invention provides a protective cover, able to protect and shield. The protective cover includes: a carrier unit and a protective lid. The carrier unit includes a first surface and a second surface, disposed oppositely. The first surface is for fixing and holding an electronic device. The protective lid is foldable in segments, with one side engaged to the second surface of the carrier unit, and the other side covering the first surface when folded. The protective lid is engaged to the second surface by an engaging means, and includes a first lid piece, a second connection piece, a third lid piece, a fourth lid piece and a fifth lid piece. The main feature is that the total width of the fifth lid piece and the fourth connection piece is wider than the width of the third lid piece, the total width of the fifth lid piece and the fourth connection piece is less than the total width of the third lid piece and the second connection piece, and the fourth lid piece is flexible. When folded, an edge of the fifth lid piece contacts the second connection piece.

When the protective cover of the present invention is engaged to an electronic device, the basic function is to protect the surface of the device. Therefore, the third lid piece and the fifth lid piece will attach to the surface of the screen of the device to protect from scratching. For sunray-shielding, the fourth connection piece is folded so that the third lid piece and the fifth lid piece are pressed against each other, and placed to a device holder inside the car. When the device holder holds the electronic device, the fifth lid piece is also held tightly on the side of the electronic device, serving as a sunray-shielding visor on the side of the electronic device to facilitate easy viewing.

The protective cover of the present invention can also be used as a support stand. Following the predefined folding, the fifth lid piece is attached to the second surface of the carrier unit and the protective lid partially becomes a hollow triangular stand of a long strip shape. As such, the electronic device can stand in a tilt angle on a flat surface, such as, a desktop. At least two tilt angles are provided for using in various situations. Because the fifth lid piece has a width less than the width of the first lid piece. When folded in a specific manner, the reactive force of the third lid piece will apply to the second surface to further stabilize the structure.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
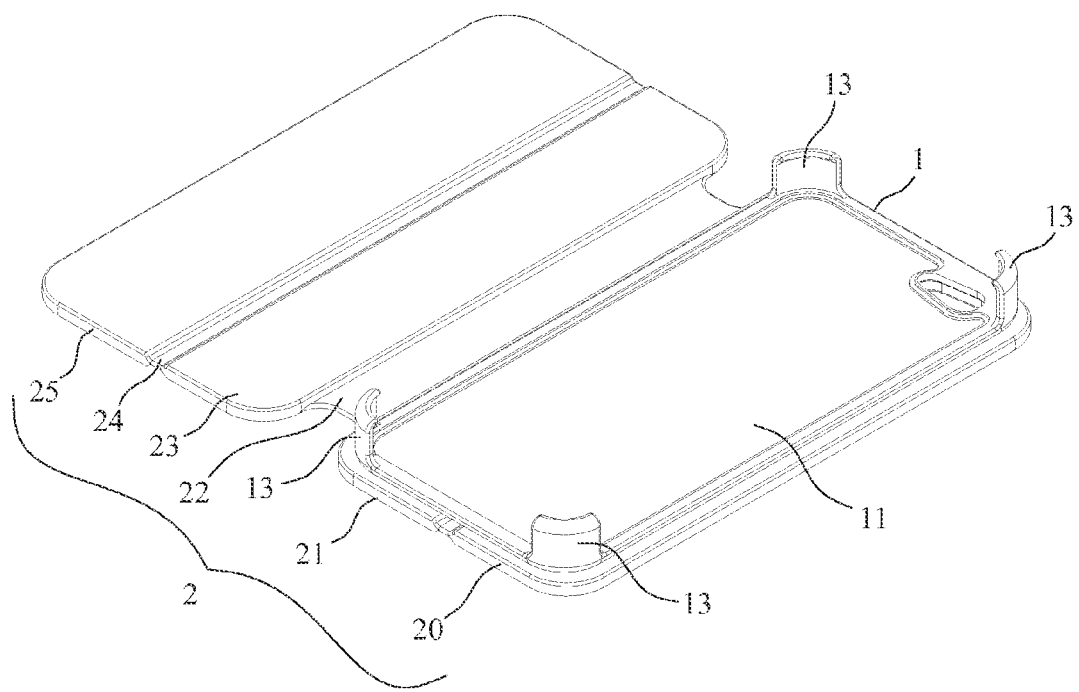
FIG. 1 shows a schematic view of the present invention in an unfolded state.
Figure 2:
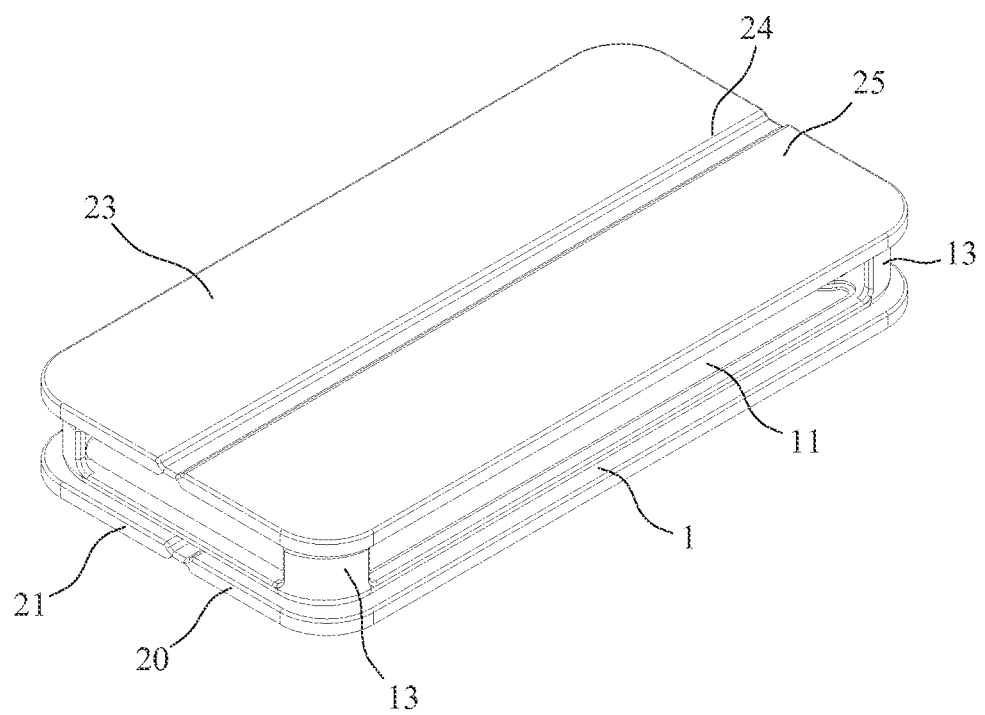
FIG. 2 shows a schematic view of the present invention in a folded state.
Figure 3:
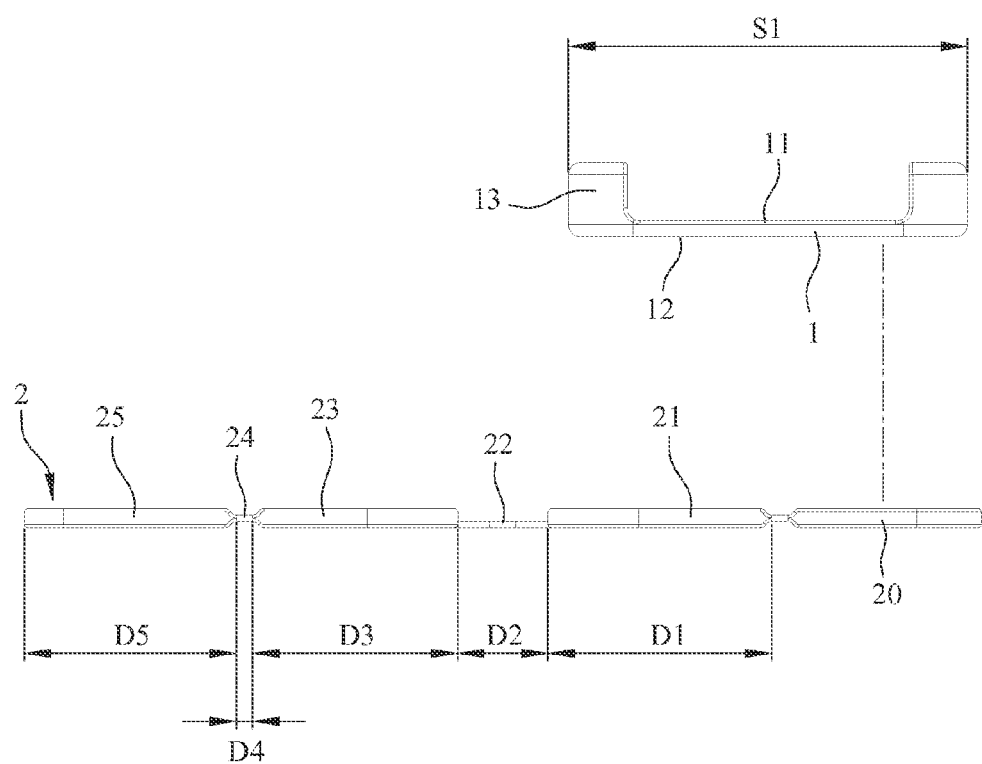
FIG. 3 shows a side view of the dissected structure of the present invention.

FIG. 1, FIG. 2 and FIG. 3 are schematic views of the present invention in an unfolded state, folded state and dissected side view. The protection cover of the present invention includes a carrier unit 1 and a protective lid 2.

The carrier unit 1 has a rectangular hard shape, with a first surface 11 and a second surface 12 disposed oppositely. The first surface 11 is for fixing and holding an electronic device. The means of fixing can be by gluing the back of the electronic device to the first surface 11 or disposing matching buckling elements respectively on the first surface 11 and the electronic device so that the matching buckle elements can be buckled together. However, the present invention does not impose any specific restriction on the fixing means. In the present embodiment, the carrier unit 1 is further disposed with a plurality of clippers 13, distributed on the peripheral surrounding of the first surface 11 and extending upwards. The area formed by the plurality of clippers 13 matches the shape of the electronic device to be fixed and held. In the embodiment, four clippers are included and are located at the four corners of the first surface 11. However, the present invention does not impose any specific restriction on the number and the distribution of the clippers. The number of clippers 13 can be two, located on two sides of the first surface 11.

The protective lid 2 can be folded, with one side engaged to the second surface 12 of the carrier unit 1. When folded, the other side of the protective lid 2 will cover the first surface 11 (as shown in FIG. 2). The protective lid 2 is engaged to the second surface 12 through an engaging means 20, and includes a first lid piece 21, a second connection piece 22, a third lid piece 23, a fourth connection piece 24 and a fifth lid piece 25. In addition to protection, the present invention also provides functions of shielding and supporting. Therefore, specific restrictions on the width of the component pieces must be placed, including: the first lid piece 21 is wider than the fifth lid piece 25, the fifth lid piece 25 has a width wider than or equal to the width of the third lid piece 23, and the fourth connection piece 24 is flexible. When folded, an edge of the fifth lid piece 25 contacts the second connection piece 22.

Figure 4A:
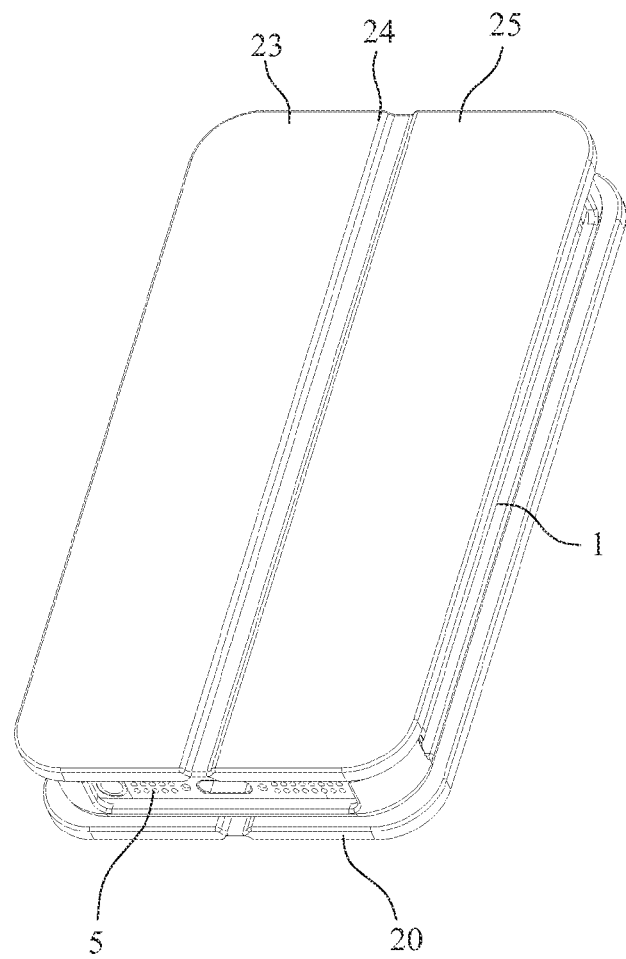
FIG. 4A shows a schematic view of the first actual application of the present invention.
Figure 4B:
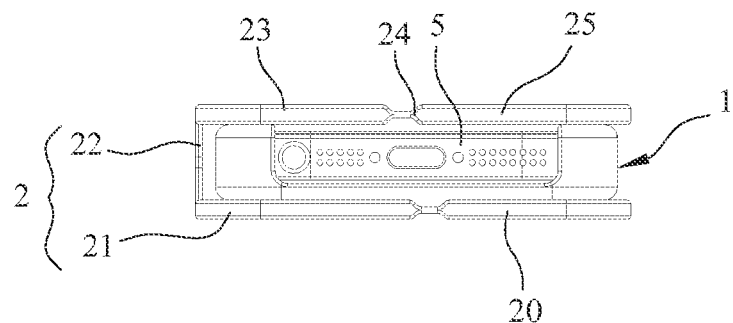
FIG. 4B shows a side view of actual application of the present invention.

When folded, the protective cover 1 of the present invention has a shape similar to the mathematic symbol "belong to". As shown in FIG. 4, the carrier unit 1 provides fixing to an electronic device 5. The protective lid 2 has only the engaging means 20 attached to the second surface 12 and the other components are not fixed. Therefore, a folded line exists between the engaging means 20 and the first lid piece 21 so that the first lid piece 21 can be lifted. In addition, the engaging means 20 does not exceed half of the area of second surface 21. The engaging means 20 can be a small segment of flexible material. When assembled, the engaging means 20 is directly attached to the second surface 12. The first lid piece 21 can be attached to the second surface 12. The second connection element 22 is made of a flexible material or partially made of a hard material. The width of the second connection piece 22 must be equal to or greater than the thickness of the electronic device 5. In the present embodiment, when the second connection piece 22 is partially made of a hard material, the joint between the second connection piece 22 and the first lid piece 21 and the joint between the second connection piece 22 and the third lid piece 23 must be foldable. Furthermore, the total width of the third lid piece 23 and the fifth lid piece 25 must be equal to or greater than the width of the electronic device 5 so as to provide protection to the surface of the electronic device 5.

Figure 5:
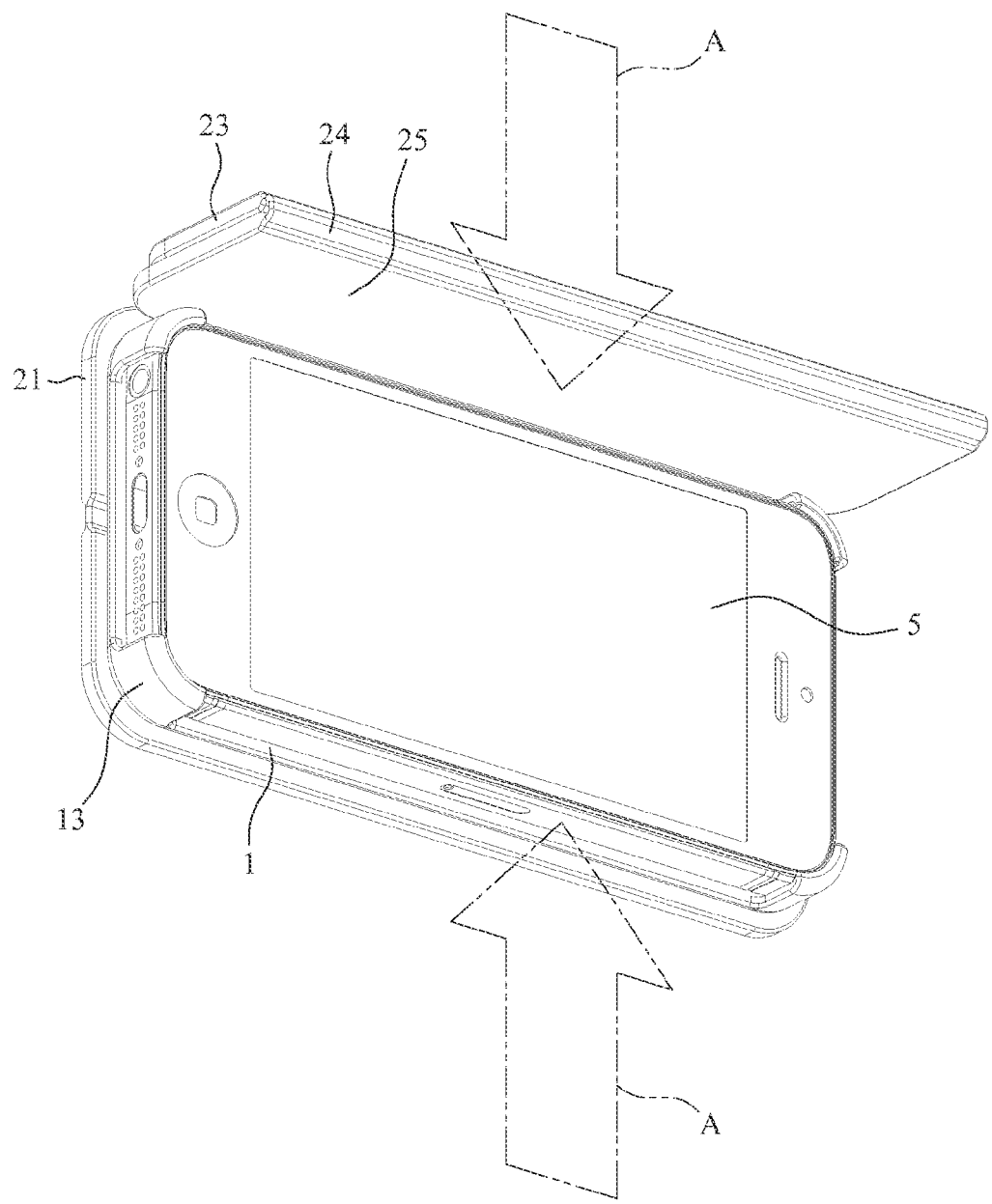
FIG. 5 shows a schematic view of the second actual application of the present invention.

As shown in FIG. 3, given that the width of the first lid piece 21 is D1, the width of the second connection piece 22 is D2, the width of the third lid piece 23 is D3, the width of the fourth connection piece 24 is D4 and the width of the fifth lid piece is D5, and the width of the carrier unit 1 is S1. For the present invention to provide shielding and supporting, the basic requirement of the present invention is $D5 \geq D3$ and $D1 \geq D5$. For preferred shielding effect, the total width of the fifth lid piece 25 and the fourth connection piece 24 must be less than the total width of the third lid piece 23 and the second connection piece 22. In other words, $(D5+D4)<(D3+D2)$. For only shielding, the total width of the fifth lid piece 25 and the fourth connection piece 24 must be less than the width of the third lid piece 23, i.e., $(D5+D4)>D3$, and the total width of the fifth lid piece 25 and the fourth connection piece 24 must be less than the total width of the third lid piece 23 and the second connection piece 22, i.e., $(D5+D4)<(D3+D2)$. In actual application as shown in FIG. 5, because the fourth connection piece 24 is flexible, the third lid piece 23 and the fifth lid piece 25 can be pressed against each other when folded. The edge of the fifth lid piece 25 extends to the second connection piece 22. The fifth lid piece 25 will be close to or contact the side wall of the electronic device 5. When the electronic device 5 is to be clamped by a device holder (arrow A indicating the direction of clamping), the fifth lid piece 25 and the third lid piece 23 are also clamped so that the fifth lid piece 25 forms a shielding visor located at the top edge of the electronic device 5.

Figure 6:
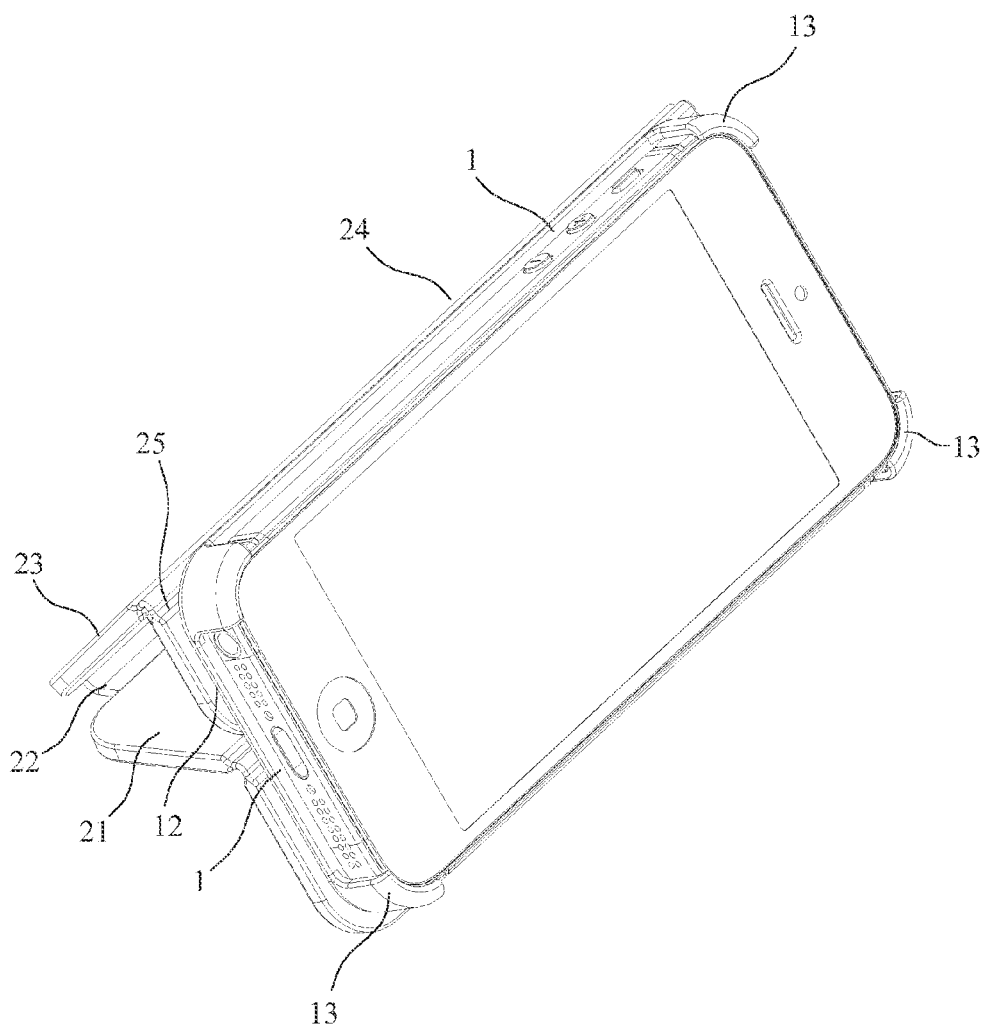
FIG. 6 shows a schematic view of the third actual application of the present invention.
Figure 7:
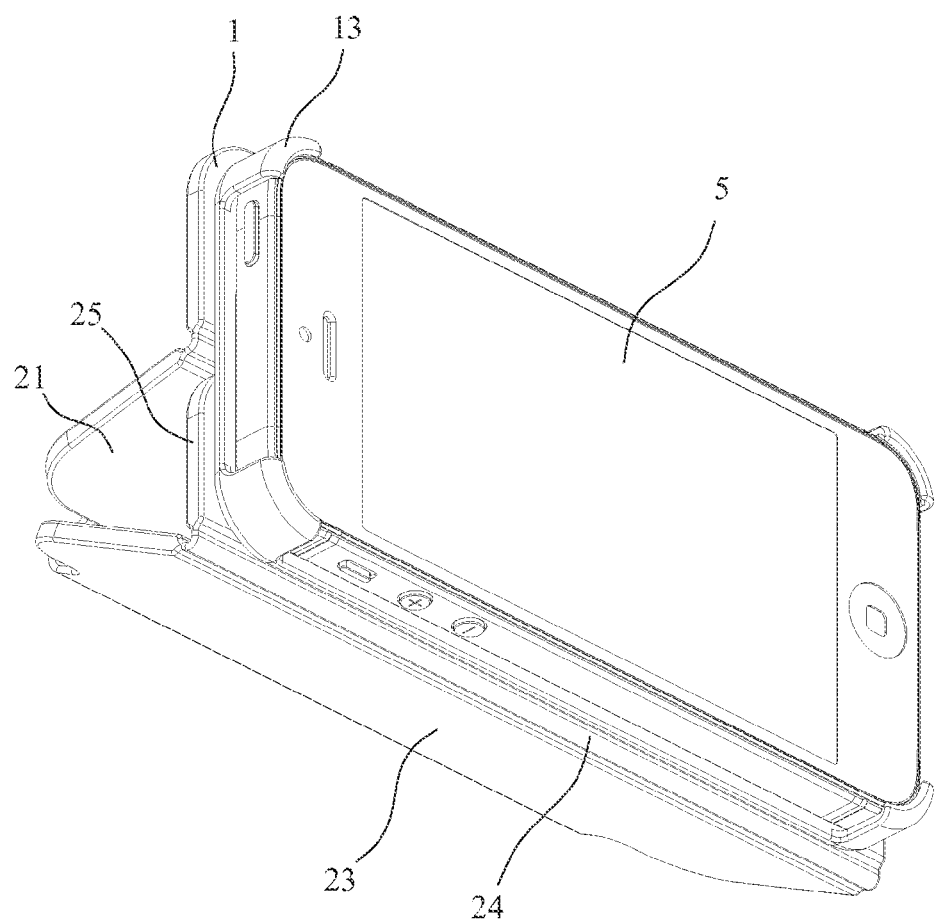
FIG. 7 shows a schematic view of the second actual application of the present invention standing in different position.

FIG. 6 and FIG. 7 show the views of the present invention applied as a supporting stand. The width of the first lid piece 21 of the present invention is greater than ¼ of the width of the carrier unit 1, i.e., $D1>(¼)S1$. In a preferred embodiment, the width of the first lid piece 21 is greater than ½ of the width of the carrier unit 1, i.e., $D1>(½)S1$. The total width of the fifth lid piece 25 and the fourth connection piece 24 is less than the width of the first lid piece 21, i.e., $(D5+D4)<D1$. When used as a supporting stand, the protective cover of the present invention uses the carrier unit 1 to fix the electronic device 5, folds the second connection piece 24 and the fourth connection piece 24 properly so that the fifth lid piece 25 is attached to the second surface 12 of the carrier unit 1, and adjust the positions of the first lid piece 21, the third lid piece 23 and the fifth lid piece 25 so that the three lid pieces form a hollow triangular stand of a long rectangle shape. As such, the electronic device 5 can stand with a tilt angle. In the present embodiment, the electronic device 5 can stand in two different angles. As shown in FIG. 6, the protective cover uses the edge of the carrier unit 1 and the second connection piece 22 to contact the surface to be placed on. At this point, the tilt angle of the electronic device 5 is less than 45°. Because the width of the fifth lid piece 25 is less than the width of the first lid piece 21, the reactive force of the third lid piece 23 is applied to the second surface 12 of the carrier unit 1 so that the structure is more stable. As shown in FIG. 7, the protective cover uses the third lid piece 23 to contact the surface to be placed on. At this point, the tilt angle of the electronic device 5 is more than 60° and close to 90°. As such, the possible angles can be used for the electronic device 5 to stand on to facilitate convenient viewing of the screen.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A protective cover, comprising: a carrier unit and a foldable protective lid; the carrier unit comprising a first surface and a second surface, disposed oppositely; the first surface being for fixing and holding an electronic device; the protective lid being foldable in segments, with one side engaged to the second surface of the carrier unit, and the other side covering the first surface when folded; the protective lid being engaged to the second surface by an engaging means, and further comprising a first lid piece, a second connection piece, a third lid piece, a fourth connection piece and a fifth lid piece, wherein the first lid piece being wider than the fifth lid piece, the fifth lid piece having a width wider than or equal to the width of the third lid piece, and the fourth connection piece being flexible; when folded, an edge of the fifth lid piece contacting the second connection piece.

2. The protective cover as claimed in claim 1, wherein a total width of the fifth lid piece and the fourth connection piece is greater than the width of the third lid piece.

3. The protective cover as claimed in claim 1, wherein a total width of the fifth lid piece and the fourth connection piece is greater than a total width of the third lid piece and the second connection piece.

4. The protective cover as claimed in claim 1, wherein when the fourth connection piece is folded, the fifth lid piece will be at least partially attached to the third lid piece.

5. The protective cover as claimed in claim 1, wherein the carrier unit further comprises a plurality of clippers, distributed on peripheral surroundings of the first surface and extending upwards forming an area matching the shape of the electronic device to be held.

6. The protective cover as claimed in claim 1, wherein the width of the first lid piece is greater than ¼ of the width of the carrier unit.

7. The protective cover as claimed in claim 1, wherein the width of the first lid piece is greater than ½ of the width of the carrier unit.

8. The protective cover as claimed in claim 1, wherein a total width of the fifth lid piece and the fourth connection piece is less than the width of the first lid piece.

9. A protective cover, comprising: a carrier unit and a foldable protective lid; the carrier unit further comprising a first surface and a second surface, disposed oppositely; the first surface being for fixing and holding an electronic device; the protective lid being foldable in segments, with one side engaged to the second surface of the carrier unit, and the other side covering the first surface when folded; the protective lid being engaged to the second surface by an engaging means, and further comprising a first lid piece, a second connection piece, a third lid piece, a fourth connection piece and a fifth lid piece, wherein a total width of the fifth lid piece and the fourth connection piece being wider than the width of the third lid piece, a total width of the fifth lid piece and the fourth connection piece being less than the total width of the third lid piece and the second connection piece, and the fourth lid piece being flexible; when folded, an edge of the fifth lid piece contacting the second connection piece.

10. The protective cover as claimed in claim 9, wherein the width of the first lid piece is greater than the width of the fifth lid piece.

* * * * *